United States Patent [19]

Patel

[11] Patent Number: 5,235,539

[45] Date of Patent: Aug. 10, 1993

[54] METHOD AND APPARATUS FOR GENERATING CARRY OUT SIGNALS

[75] Inventor: Samir Patel, Union City, Calif.

[73] Assignee: Sun Microsystems, Inc., Mountain View, Calif.

[21] Appl. No.: 682,575

[22] Filed: Dec. 12, 1990

[51] Int. Cl.[5] .............................................. G06F 7/50
[52] U.S. Cl. ................................................... 364/787
[58] Field of Search ............... 364/768, 786, 787, 788, 364/784, 785

[56] References Cited

U.S. PATENT DOCUMENTS

| | | | |
|---|---|---|---|
| 4,918,642 | 4/1990 | Chang | 364/787 |
| 4,949,297 | 8/1990 | Matsuoka | 364/787 |
| 5,043,934 | 8/1991 | Lamb | 364/787 |

OTHER PUBLICATIONS

Schmookle et al., IBM Technical Disclosure Bulletin, vol. 6, No. 1, Jun. 1963. (Group-Carry Generator).

Primary Examiner—Jerry Smith
Assistant Examiner—Chuong D. Ngo
Attorney, Agent, or Firm—Blakely Sokoloff Taylor & Zafman

[57] ABSTRACT

A circuit for determining the carry out from the addition of two numbers independent of the determination of the sum of the two numbers including apparatus for determining a first carry out from each bit position for a carry in of a first value, apparatus for determining a second carry out from each bit position for a carry in of a second value, a plurality of apparatus for utilizing the first and second carry out values from two or more adjacent bit positions to produce a first carry out from each plurality of bit positions for a carry in of a first value, and second carry out from each plurality of bit positions for a carry in of a second value, and apparatus for selecting between the first and second values based on the actual values of the carry ins.

6 Claims, 12 Drawing Sheets

3-bit Carry Expander/Selector:

Cout_ = !((((Cin2_0 * !Cin1_0) + (Cin2_1 * Cin1_0)) * !Cprev) + (((Cin2_0 * !Cin1_1) + (Cin2_1 * Cin1_1)) * Cprev))

METHOD AND APPARATUS FOR GENERATING CARRY OUT SIGNALS

BACKGROUND OF THE INVENTION

1. Field of the Invention

This invention relates to computer circuits and, more particularly, to methods and apparatus for rapidly generating the carry out signals for adder circuits.

2. History of the Prior Art

Adder circuits are used in digital computers for many purposes. In most of those uses, the speed of those circuits is paramount. For example, the primary manner in which the sequential flow of information is changed in a digital computer is through the use of conditional branch operations. In general, a conditional branch operation depends on some arithmetic operation and, based on the result, makes a decision whether or not to branch to a particular address. The result of the arithmetic operation usually involves a summation, carry outs, and a sign; and the decision may depends on any of these elements, combinations of these elements, or flags generated from these elements. The length of time required to generate flags which depend on the final carry out value is usually the critical element and is, consequently, a major factor in achieving higher processor speed.

There has been a plethora of work directed to improving the speed of adders. Much of this work has been directed to improving the speed of computation of the carry out since this computation usually takes the longest time. This is true because the carry out from the most significant stage depends on what has happened at each of the lower stages of the addition. Typically, the carry out at each stage is computed along with the computation of the sum. Ultimately, the carry out and the sum are used to compute other factors necessary for deciding the conditional branch functions.

Carry look ahead, carry select, and Manchester carry chain schemes are some of the fast hardware implementations of adders. Carry look ahead adders and Manchester carry chain adders are limited in speed because their operation is inherently serial in nature. Carry select adders, on the other hand, compute two results of groups of digits in parallel and select the correct one of the two after the carry-in value to the group is known. When a number of columns are computed in parallel as subsets, at least in theory very fast operation could result. However, in reality such adders take up a great deal of circuitry and are therefore expensive to implement and slower than theoretically predicted. An arrangement is needed which operates rapidly yet does not utilize the very large amount of circuitry required by the prior art.

One form of adder which in theory produces very fast results is the conditional sum adder described by J. Sklansky in an article entitled "Conditional-Sum Addition Logic", published in June 1960, IRE Transactions On Electronic Computers. Although it was suggested that this form of adder would produce very fast results, the very large number of gates required to produce those results and the delay through those gates have made such an adder in practice no faster than other fast adders. Consequently, it is still true that an arrangement is needed which operates rapidly yet does not utilize the very large amount of circuitry required by the prior art.

SUMMARY OF THE INVENTION

It is, therefore, an object of the present invention to provide new circuitry for computing the carry out from the summation of two binary numbers. It is another more specific object of the present invention to provide circuitry which computes the carry out of the sum of two binary numbers rapidly and separately from the sum of the two numbers.

It is yet another more specific object of the present invention to provide circuitry to generate rapidly all of the flags necessary to conditional branch operations.

These and other objects of the present invention are realized in a circuit that separates the carry generation function from the summation function of the adder to produce a much faster carry generation. By utilizing two possible carry outs values from each bit of two numbers being added, then in successive stages combining the two possible carry outs of each bit with two possible carry outs from one or more lower order bits to generate two possible higher order carry outs and continuing this process until an actual carry out for preceding stages is determined, a final carry out can be generated before the result of the summation is obtained. This carry out is used to rapidly determine all of the flags required to arrive at the results for conditional branch operations.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a machine and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
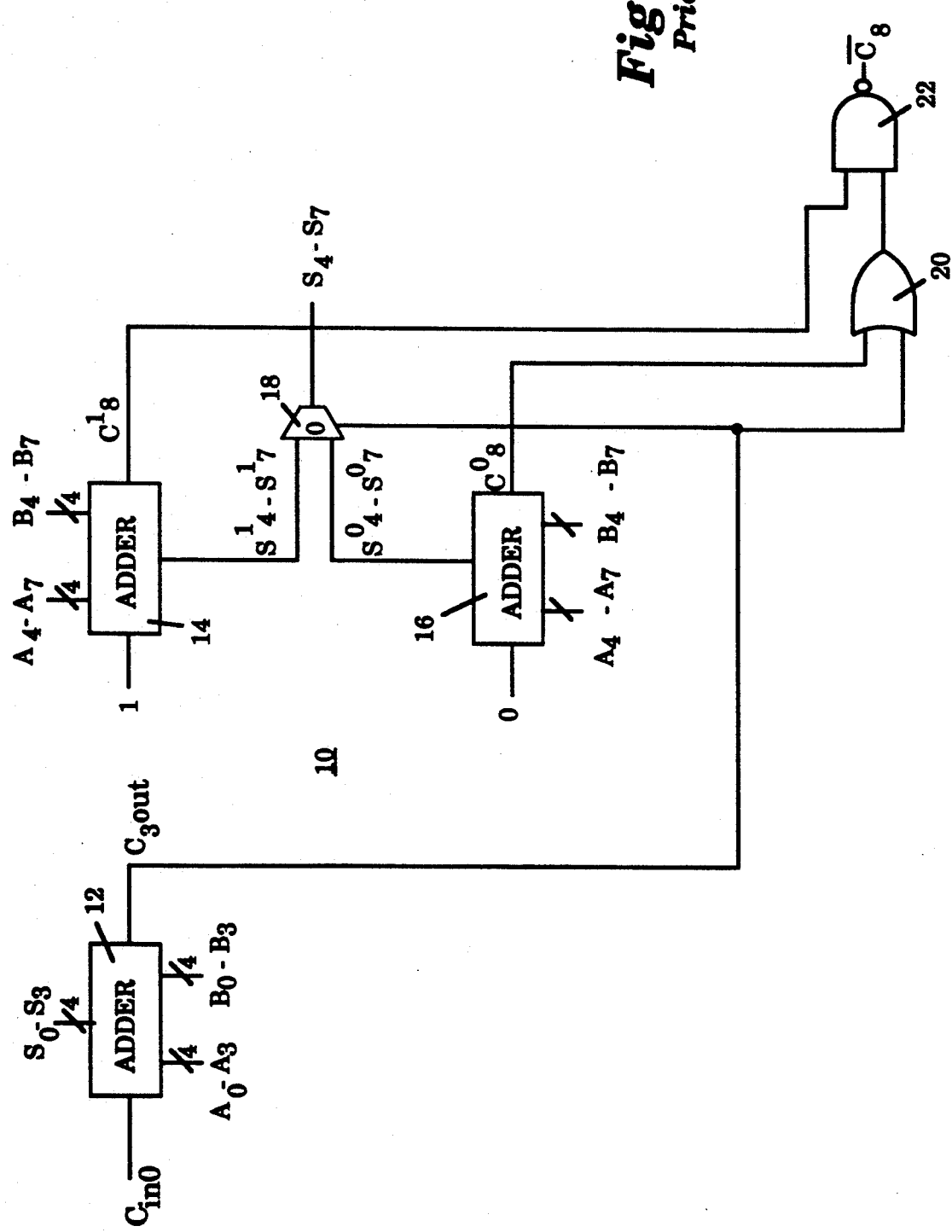
FIG. 1 is a block diagram of a typical adder circuit of the prior art.

FIG. 1 illustrates a typical arrangement for obtaining the rapid addition of two binary numbers. A first carry-look-ahead adder 12 is utilized to add together the lower four bits of two binary numbers A and B. The adder 12 receives the carry-in signal Cin0 and propagates that signal through the stages combining it with the bits being added at the various stages to produce a result S0-S3 and a carry-out signal C3 from the last stage. Simultaneously, an adder circuit 14 receives the higher order bits 4-7 of the two binary numbers A and B and computes a sum S1_4-S1_7 and a carry out C1_7 presuming a carry in from stage three of one; and an adder circuit 16 is furnished the higher order bits of the two numbers A and B and computes a sum S0_4-S0_7 and a carry out C0_7 presuming a carry in from stage three of zero. The correct higher order sum bits are selected by the final carry out C3 from the adder 12 using a multiplexor 18. In a similar manner, the correct final carry out "not C8" is produced by an OR gate 20 and an NAND gate 22 which select from the two possibilities depending on the condition of the carry out C3.

As may be seen, producing the carry out "not C8" requires that the circuitry of FIG. 1 wait for the results of the various additions of the bits of the numbers A and B in the adders 12, 14, and 16 to determine the sums S0-S7 within the stages as well as the carry computations. This slows the operation of the adder and the generation of carry out signals. For example, the carry out C3out of the adder 12 is used within the blocks 18 and 20 to control the multiplexing of the sum value as well as the computation of "not C8". This use in computing sum values increases the amount of logic involved and, consequently, the time required for producing a final carry output.

Figure 2:
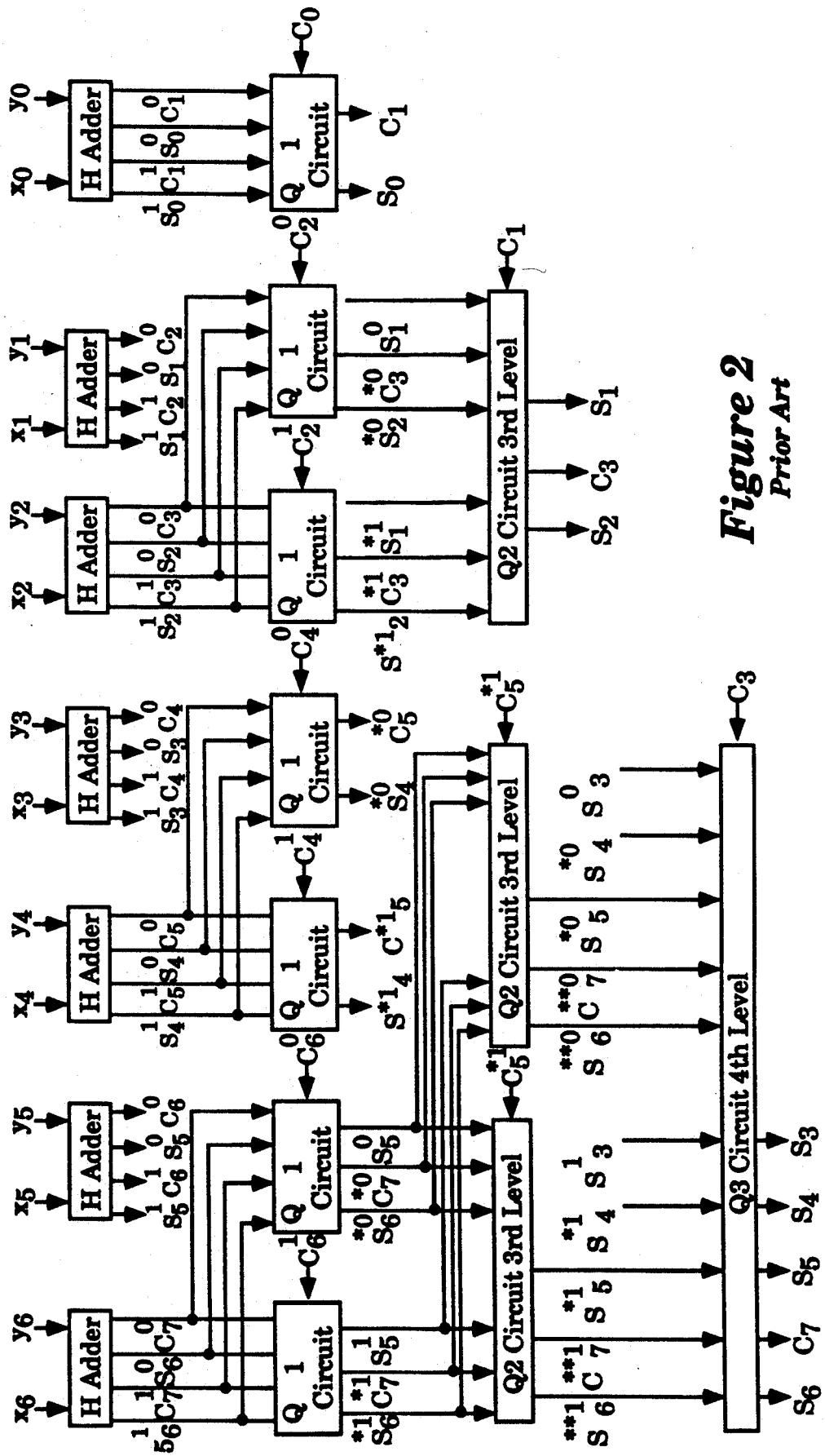
FIG. 2 is a block diagram of a conditional sum adder proposed by the prior art.

FIG. 2 illustrates a conditional carry adder proposed by Sklansky in the above-mentioned paper. In this adder, two seven bit numbers are added bit by bit (represented by x0y0 through x6y6) at a first level by bit adders H to produce four possible outputs from each of the adder circuits: a sum produced if the carry in is zero, a sum produced if the carry in is one, a carry out produced if the carry in is zero, and a carry out produced if the carry in is one. The output signals produced by alternate ones of these first level adder circuits H are furnished to pairs of second level circuits Q1. The circuits Q1 are enabled by either a carry in zero or a carry in one from the output of the preceeding bit. Thus these circuits transfer to their outputs signals which depend on the state of the carry in from the preceeding stage. This continues to a next level where the possible sums and carry outs of the two Q1 stages are both furnished to a second pair of circuits Q2 along with the possible sums from the preceding stage. One of the circuits Q2 is enable by a zero carry in from the preceding stage and the other by a one carry in. This continues for as many stages as are necessary for the number of bits in the two numbers to be added. Thus, the results of each level are reached without waiting for the results of the previous level so that at the Q3 level all of the carry possibilities still exist. This theoretically allows very fast operation. In fact, the speed of operation is dependant upon the time required to produce the actual carry out values (C1, C3, C5, etc) from each level, and these values and the possible sum bits at each level are determined using intermediate possible carry out values.

Moreover, as may be seen from viewing the circuit of FIG. 2, the circuitry required to implement the arrangements shortly becomes overwhelming. In fact, Sklansky specifically warns circuit designers that "the maximum fanout is an increasing function of the summand length." This increase in the number of gates due to the inclusion of the circuitry for summing the bits greatly increases the cost of the arrangement and the time taken by the adder to produce a carry out value. This is probably the reason that no practical arrangements of this type have been implemented.

It has now been discovered that by separating the carry generation function from the summation function of the adder a much faster carry generation may be accomplished. Moreover, by utilizing the basic arrangement of a conditional sum adder with only the two possible carry outs from each bit of the two numbers being added to generate two possible carries, then in successive stages combining the two possible carry outs from each bit with two possible carry outs from one or more lower order bits to generate two possible higher order carries and continuing this process until an actual carry from preceding stages is determined, a final carry out can actually be generated more rapidly than the result of the summation can be obtained. The separation of the generation of the carry out values eliminates the delays caused by the summation circuitry in the prior art arrangements.

Figure 3:
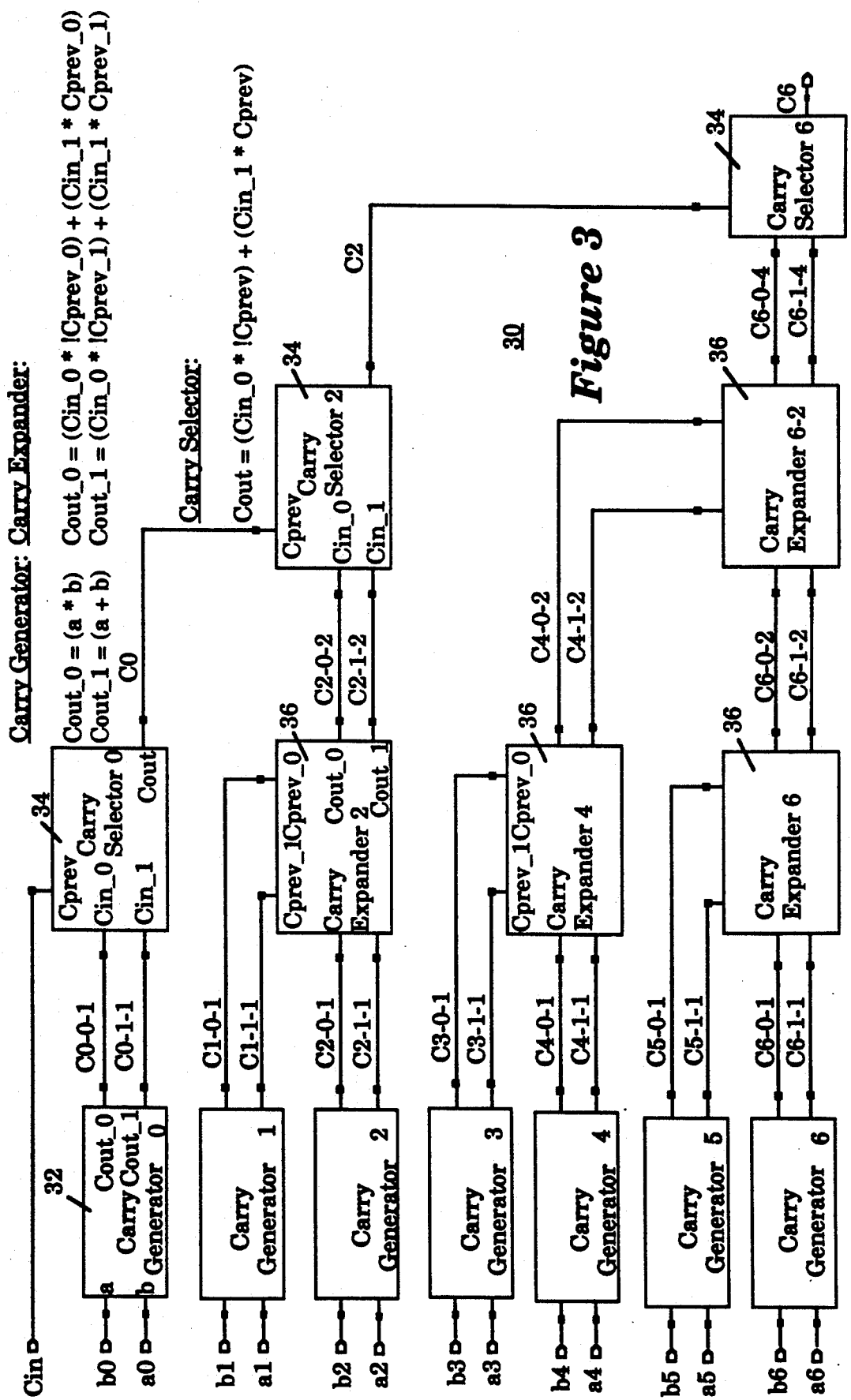
FIG. 3 is a block diagram of a first carry compute circuit constructed in accordance with the invention.

FIG. 3 illustrates a block diagram of a basic circuit constructed in accordance with the invention. The circuit 30 illustrated in FIG. 3 is utilized to generate the carry-out bit from the addition of two eight bit binary numbers. Only the lower seven bits of an eight bit number need be used to obtain the carry out value and the other values necessary to the determination of conditional branch equations as will be seen from the discussion which follows. The circuit 30 includes seven individual carry generator circuits 32 which are individually designated carry generator 0 through carry generator 6. Each carry generator circuit 32 receives as input two bits, one each from the addend and the augend, at the particular bit position. Thus, the two lowest order bits to be summed are placed in the carry generator 0. Simultaneously, all of the other carry generators 1–6 receives the two bits of the augend and addend at their particular bit positions.

Each carry generator 32 produces two possible carry out values; these values are the carry out from the stage if the carry in to that bit is a zero the carry out from the stage if the carry in is a one. For carry generator 0, these signals are designated C0-0-1 and C0-1-1, the designation indicating first a carry out for bit 0, next a carry out for a zero or one carry in value, and finally that the carry outs result from a single level of determination. The carry out signals from the other carry generators 32 and the other circuitry described are similarly designated.

As those skilled in the art will realize, the results produced by the carry generators 32 may be summarized by the two equations placed under the title "Carry Generator" to the right of the circuitry in FIG. 3. That is, the carry out signal where the carry in signal is a zero (Cout_0) can be a one only if both of the bits summed at that level are ones. Additionally, the carry out signal where the carry in signal is a one (Cout_1) can be a one only if one of the bits summed at that level is a one. These two carry out signals are propagated from each of the carry generators 32 to the next stage. But if the Cout_0 signal is a one, it is impossible for the carry out signal Cout_1 to produce a zero carry out signal since both bits to be summed are ones. This fact is used to reduce the complication of the circuitry in the following stages of this circuit (and in other circuits discussed hereinafter) by eliminating the need to provide totally complementary logic.

The carry out values from each of the carry generators 0-6 are transferred to a second stage. For the lowest order bit 0, this stage is a carry selector 34. The carry selector 34 receives the two possible carry out values from the preceding stage (carry generator 0 in this case) and selects the correct one of the two based on the actual carry in value Cprev from the preceding stage. This carry select operation may be expressed by the equations for "Carry Select" shown to the right in the drawing in FIG. 3. It may be seen that the carry out for a zero carry in is selected if the carry in Cprev from the previous stage is zero, and the carry out for a one carry in is selected if the carry in Cprev from the previous stage is one.

The carry selector 0 thus produces the actual carry out C0 from the bit 0 stage at the first level. This result is transferred to an identical carry selector circuit 34 identified as carry selector 2. The carry out C2 from carry selector 2 is in turn transferred to an identical carry selector 6.

For each bit stage other than bit 0, the two possible carry outs from the carry generator circuit 32 are furnished to a carry expander circuit 36. Four of these carry expander circuits 36 are illustrated in FIG. 3, and each operates in the same manner. Each expander circuit 36 on the first level (expanders 2, 4, and 6) receives from the carry generators 32 of two adjacent bit positions the two possible carry outs from those bit positions, and provides two possible carry out signals based on those four possible inputs. Thus, for example, the carry expander 2 receives the carry out signals C1-0-1 and C1-1-1 from the carry generator 1 for bit 1, and the carry out signals C2-0-1 and C2-1-1 from the carry generator 2 for bit 2. These four signals are used to generate the two possible outs C2-0-2 (possible carry out if carry in to bit 2 is zero, second level) and C2-1-2 (possible carry out if carry in to bit 2 is one, second level). The logical equations defining the operation of the expander circuits 36 are given in FIG. 3 under "Carry Expander" to the right of the figure.

The two possible values produced by each carry expander circuit 36 are transferred to either a carry selector circuit 34 or another carry expander 36 depending on the level of the bits involved. At the bit two level, the two carry outs are transferred to a carry selector 2, for example, where the carry out C0 from carry selector 0 selects the appropriate one of the two carry out signals which result from the four possible carry outs at the carry generator level. The two carry outs from carry expander 4 and the two carry outs from carry expander 6, on the other hand, are both transferred as the inputs to a second level carry expander 6-2. These signals which represent a total of four possible carry outs from the carry generator level are combined in the same manner as for the other carry expander circuits 36 to produce two possible carry out signals C6-0-4 and C6-1-4. The final carry out signal C6 is selected from these last two possible carry out signals by carry selector 6 in response to the actual carry out value C2 from bit 2.

It should be noted that since a final carry out value is all that is needed in order to assist in determining the branching operation to be taken, none of the intermediate values is necessary to the carry out result. Furthermore, since the carry out function is separated from the summing function in the invention, the intermediate carry out bits are used only to generate higher order carry out bits and are not delayed by the necessity to be utilized in generating a plurality of summations as in the circuit illustrated in FIGS. 1 and 2. In fact, the separation of carry from adder makes "the maximum fanout a constant rather than an increasing function of the summand length." As pointed out above, the carry out bit C6 may be utilized in an eight bit adder since it is only necessary that the next to most significant bit be available to compute the carry out from the most significant bit. This may be demonstrated from the following equations which illustrate that the carry out flag, the N flag, the V flag, and the L flag may all be generated once the carry out C6 (and thus !C6) at the next to most significant bit is obtained. These are almost all the flags except the zero flag necessary to determine a conditional branch operation. The zero flag goes active when the sum of two operands equals zero. There is an already established fast implementation for generating the zero flag in the industry.

$$Cflag = (a7 * b7) * !C6 + (a7 + b7) * C6$$

$$Nflag = (a7 \times OR\ b7) * !C6 + (!(a7 \times OR\ b7)) * C6$$

$$Vflag = (a7 * b7) * !C6 + ((!a7)) * C6$$

$$Lflag = (Nflag \times OR\ Vflag) = (a7 + b7) * !C6 + (a7 * b7) * C6$$

Figure 4:
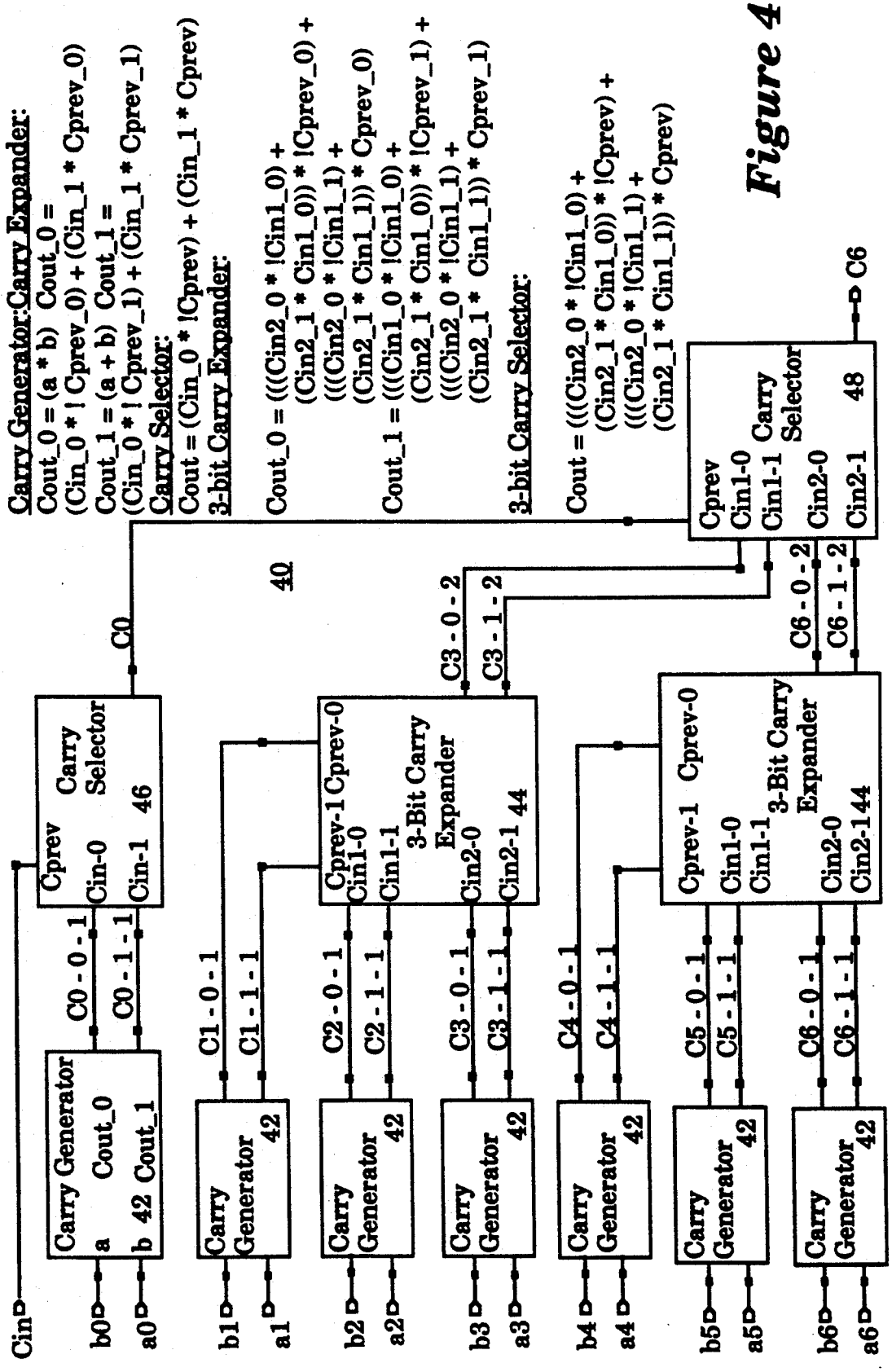
FIG. 4 is a block diagram of a second carry compute circuit constructed in accordance with the invention.

As may be seen, in FIG. 3 four stages of operation are required for computing the carry out in adding two eight bit binary numbers using the circuit described therein. A further improvement in speed may be attained by recognizing that the carry expander and carry selector circuits do not have to handle only two bits at a time. In fact, they may handle any number of bits and may be combined. FIG. 4, for example, illustrates a modified circuit 40 which produces the carry out signal from the addition of two eight bit numbers using only three stages of operation. As may be seen, the circuit 40 includes the same number of carry generator circuits 42 as does the circuit 20 of FIG. 3. However, the circuit 40 includes only two carry expanders 44, a carry selector 46, and a second carry selector 48 to accomplish the production of the final carry out in only three levels and help to speed the production of the final carry out signal. The carry expanders 44 each receive a pair of possible carry out signals from each of three (rather than two) individual carry generators 42 and produce a pair of possible carry out signals. These signals are generated in accordance with the equations illustrated in FIG. 4. The carry selector 46 is identical to the carry selectors 34 used in the circuit 30 of FIG. 3 and produces a single carry out signal C0 resulting from the addition of the bits at bit 0 and the carry in signal. Carry selector 48, on the other hand, receives the two possible carry out signals from each of the carry expanders 46 and selects the appropriate carry out signal C6 based on the carry out C0 from the carry selector 46. The operation of the carry selector 48 is actually both carry expansion and selection and is based on the equations for that function illustrated in FIG. 4.

Figure 5:
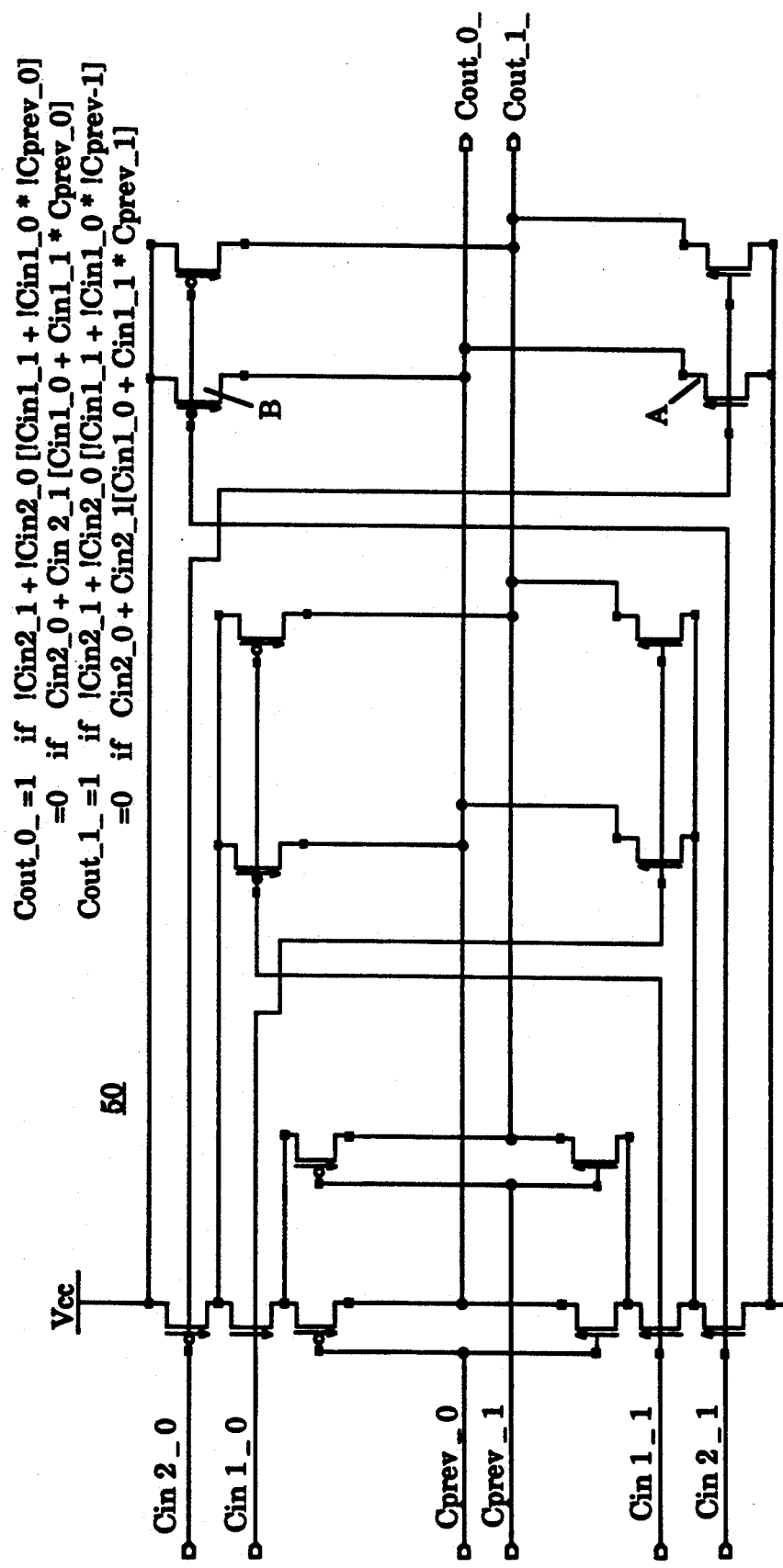
FIG. 5 is a circuit diagram of a portion of the circuit illustrated in FIG. 4.

FIG. 5 illustrates a circuit 50 which may be utilized to accomplish the functions described by the equations for the three bit carry expander circuit 44 illustrated in FIG. 4. As may be seen in FIG. 5, the circuit 50 receives the two possible carry out signals from each of three bit positions as inputs signals and produces a pair of possible output signals Cout_0 and Cout_1. The actual circuit is constructed of a plurality of p-channel FET devices (all of the devices above the Cprev_0 input line in the figure) and a plurality of n-channel FET devices (below the Cprev_0 input line in the figure). The p-channel devices are each turned on by zero signals applied to the gate terminal while the n-channel devices are each turned on by one signals applied to the gate terminal. This circuit construction applies for all of the circuit diagrams illustrated.

The operation of the circuit 50 illustrated in FIG. 5 may be understood from the general equations positioned below the circuit 50. For example, the carry out signal Cout_0_ is not a one (is a zero, because the circuit is carried out in inverting logic) under a number of different circumstances. One of these circumstances is if the carry out signal for a zero carry in of the highest of the three bits Cin2_0 is a one and the carry out signal for a zero carry in of the next highest of the three bits Cin1_0 is a zero and the carry out signal for a zero carry in of the next lowest of the three bits Cprev_0 is a zero. The connections made in the circuit in response to these three inputs can be seen to place ground at the Cout_0_ terminal through the transistor A. The response of the circuit of FIG. 5 may be seen to follow the other elements of the equations in a similar manner.

Figure 6:
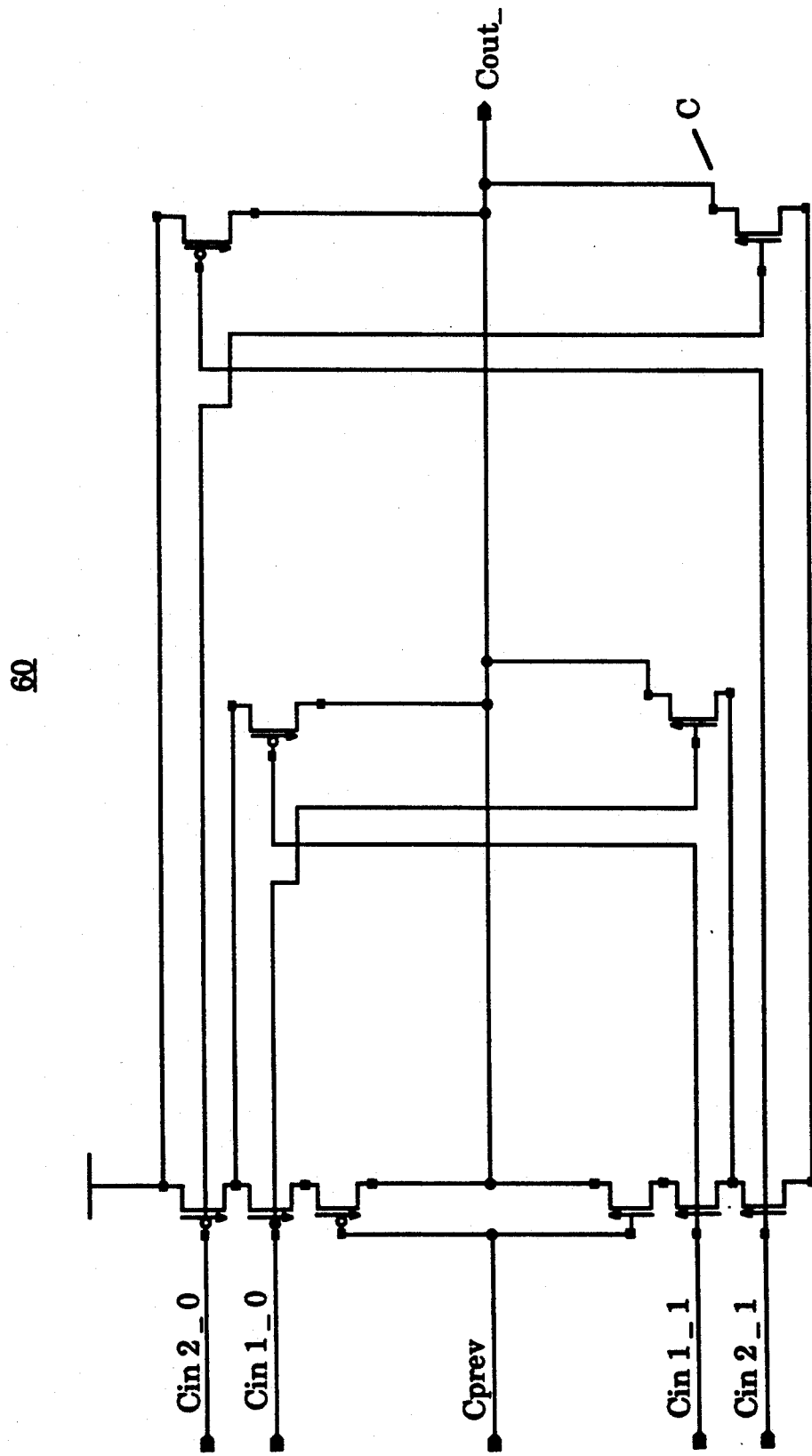
FIG. 6 is a circuit diagram of another portion of the circuit illustrated in FIG. 4.

Although the general equations described under the circuit 50 may be utilized to implement operable circuits, the present invention as represented by the circuit 50 provides faster operation than does the complete implementation of these general equations. The circuit of FIG. 5 makes use of the fact that certain input conditions cannot occur to reduce the complexity necessary to operate in accordance with the equations. These conditions are that Cin2_0=1 and Cin2_1=0 cannot both occur simultaneously. In a like manner, Cin1_0=1 and Cin1_1=0 cannot both occur; and CPrev_0=1 and Cprev_1=0 cannot both occur. For example, in the circuit of FIG. 5, if Cin2_0=1, the transistor labelled A connects ground to the line Cout_0; if Cin2_1=0, the transistor labelled B connects Vcc to the line Cout_0_. This would be disasterous in a circuit in which both conditions could occur simultaneously. To cause it not to affect the circuit, a typical prior art arrangement would provide additional transistors to keep the two conditions from occurring simultaneously. However, the present invention takes cognizance of the fact that the conditions cannot logically occur and reduces the circuitry required. This makes the circuit operate faster than might be expected using the typical circuits which might be constructed to implement the logic. The equations illustrated in FIG. 5 above the circuit 50, in fact, illustrate more exactly the operation of the circuit 50 as it is constructed without the redundant stages. A simple count of the number of conditions which must exist to render an operation true will illustrate how many fewer stages are required in the preferred embodiment of the circuitry of the present invention than would be required were the entire equation to be implemented. Although not discussed in detail with regard to the other circuits of this invention, it should be noted that each of these other circuits makes use of the same fact to reduce the circuitry necessary to implement the invention. FIG. 6 illustrates in a similar manner a circuit 60 which may be utilized to accomplish the functions described by the equations for the carry selector circuit 48 illustrated in FIG. 4. As with circuit 50 of FIG. 5, the operation of the selector may be understood from considering the equations for that three bit selector in FIG. 4. For example, the carry out signal Cout_ is a one (is a zero) under a number of different circumstances. One of these circumstances is if the carry out signal for a zero carry in of the highest of the three bits Cin2_0 is a one and the carry out signal for a zero carry in of the next highest of the three bits Cin1_0 is a zero and the carry out signal for the carry in of the next lowest of the three bits Cprev is a zero. The connections made in the circuit in response to these three inputs can be seen to place ground at the Cout_ terminal through the transistor B. The other elements of the equations may be seen to occur in a similar manner.

The method of implementing the circuits in inverting logic should be noted. In each case the arrangement is such that the transistors furnish the source voltage directly to the next stage of the circuitry. In this manner, it is unnecessary to provide buffer stages for making up for any losses in the stage. Thus the delays which might have been produced in circuitry using standard multiplexors and buffers is eliminated.

Figure 7A:
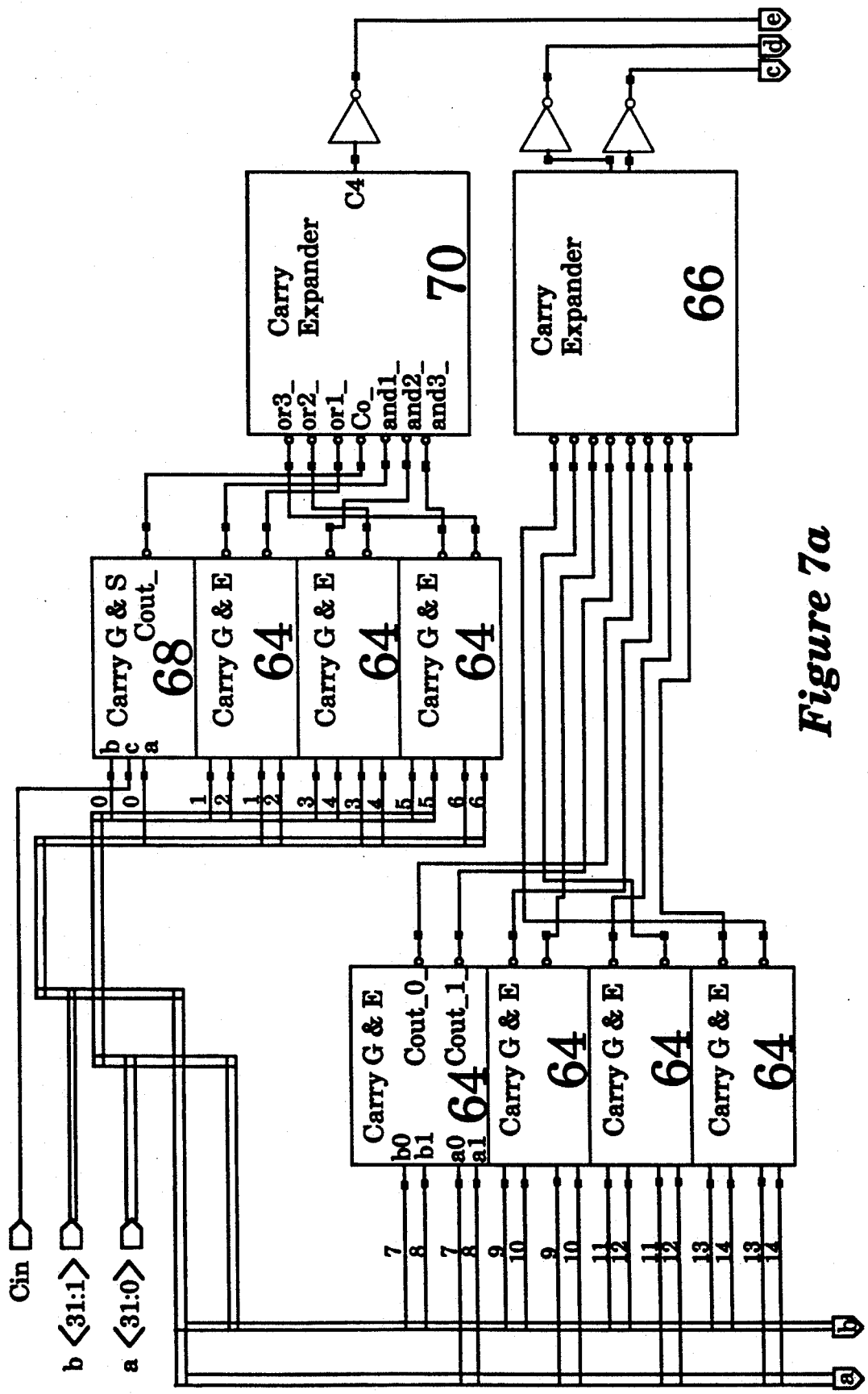
FIGS. 7a and 7b are a block diagram of a third carry compute circuit constructed in accordance with the invention.
Figure 7B:
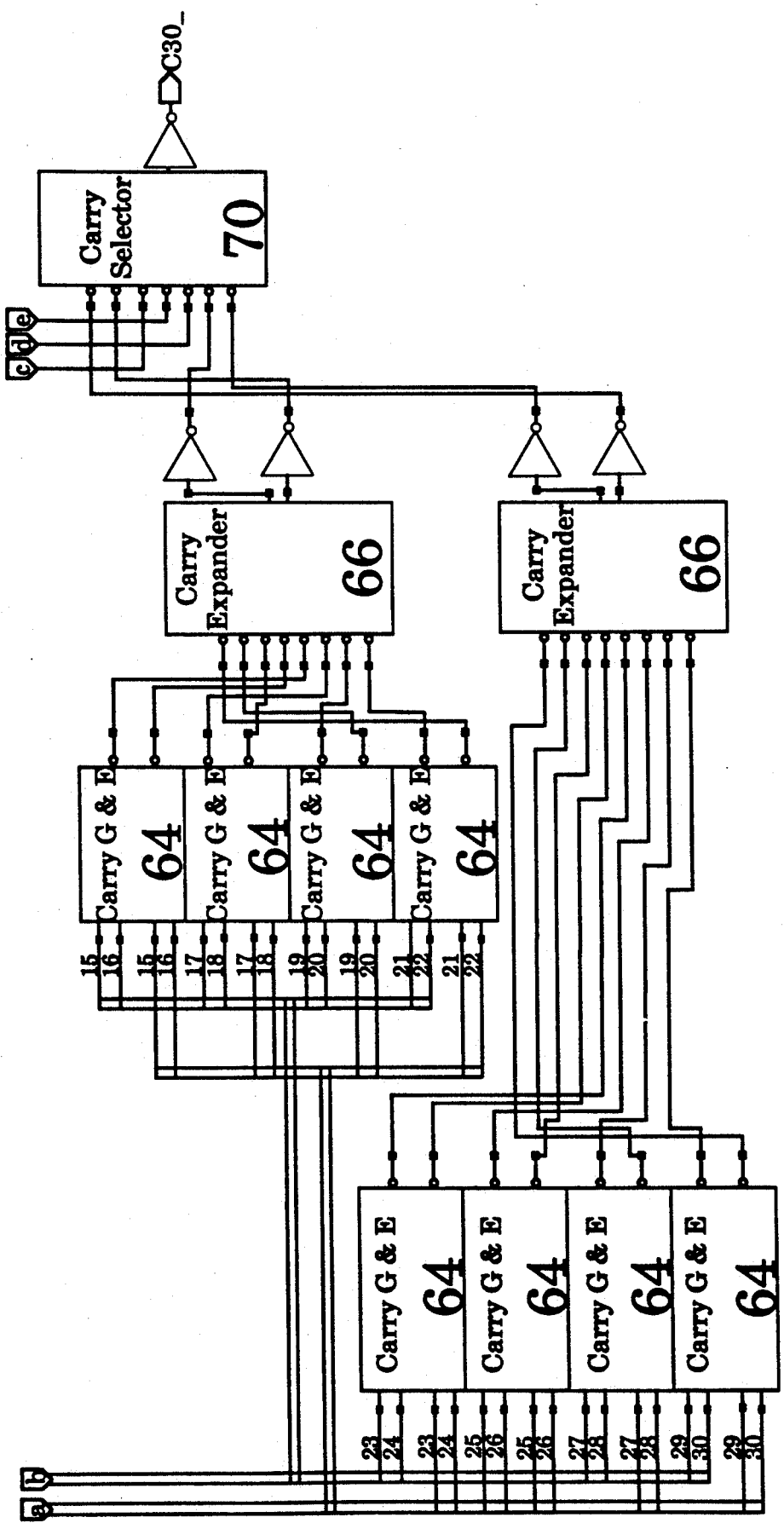

A circuit designed in accordance with the present invention for producing the carry out signal for a thirty-two bit addition is illustrated in FIGS. 7a and 7b. The elements of the block diagram include two bit carry generation and expander circuits 64 which serve the functions of both generating and expanding from a pair of bit positions, three four bit carry expander circuits 66, one two bit carry generation and selector circuit 68 which serves the functions of both generating and selecting from a single bit position, and two four bit carry selectors 70. The circuits 64 function in the manner described above to generate the possible carry outs at each of a pair of bit positions 1-30 and combine each the carry outs from each two adjacent bits after the first bit to produce two more possible carry outs. The circuits 66 further combine the results of each four combination for bits 7-30 to reach two more possible carry outs. The possible carry outs from the circuits 66 are all provided as inputs to the rightmost selector circuit 70. The possible carry outs from the circuits 64 from bits 1-6 are furnished to the leftmost carry selector circuit 70 and the carry out C6 is selected using the carry out C0 determined for bit 0 by the carry generator and selector circuit 68. The carry out C6 from the carry selector circuit 70 which selects from the first seven bit levels is used to select the carry out C30 from the rightmost circuit 70 which is used to generate the flags necessary to control the conditional operations mentioned above.

Figure 8:
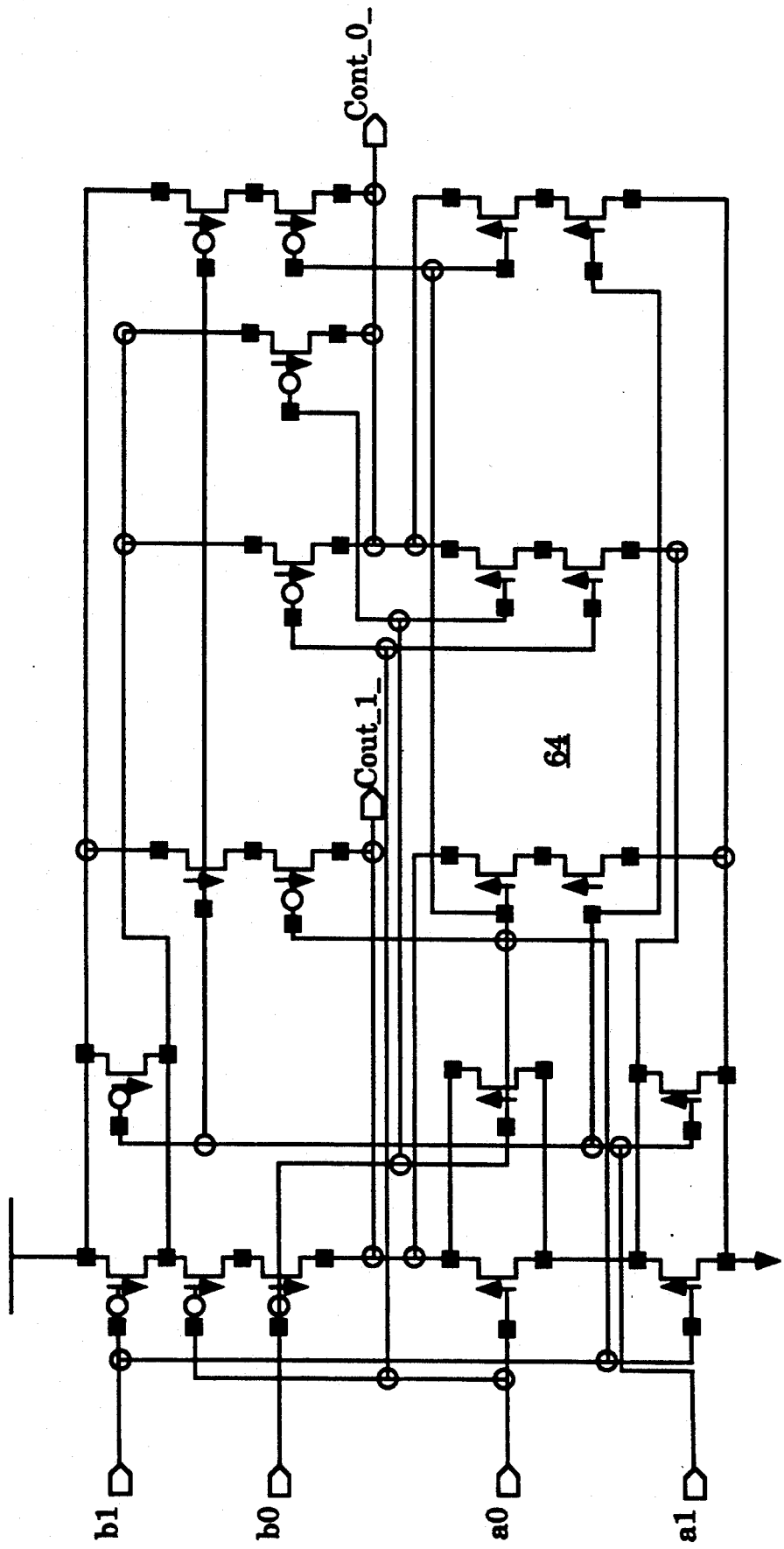
FIGS. 8-11 are circuit diagrams of portions of the circuit illustrated in FIGS. 7a and 7b.
Figure 9:
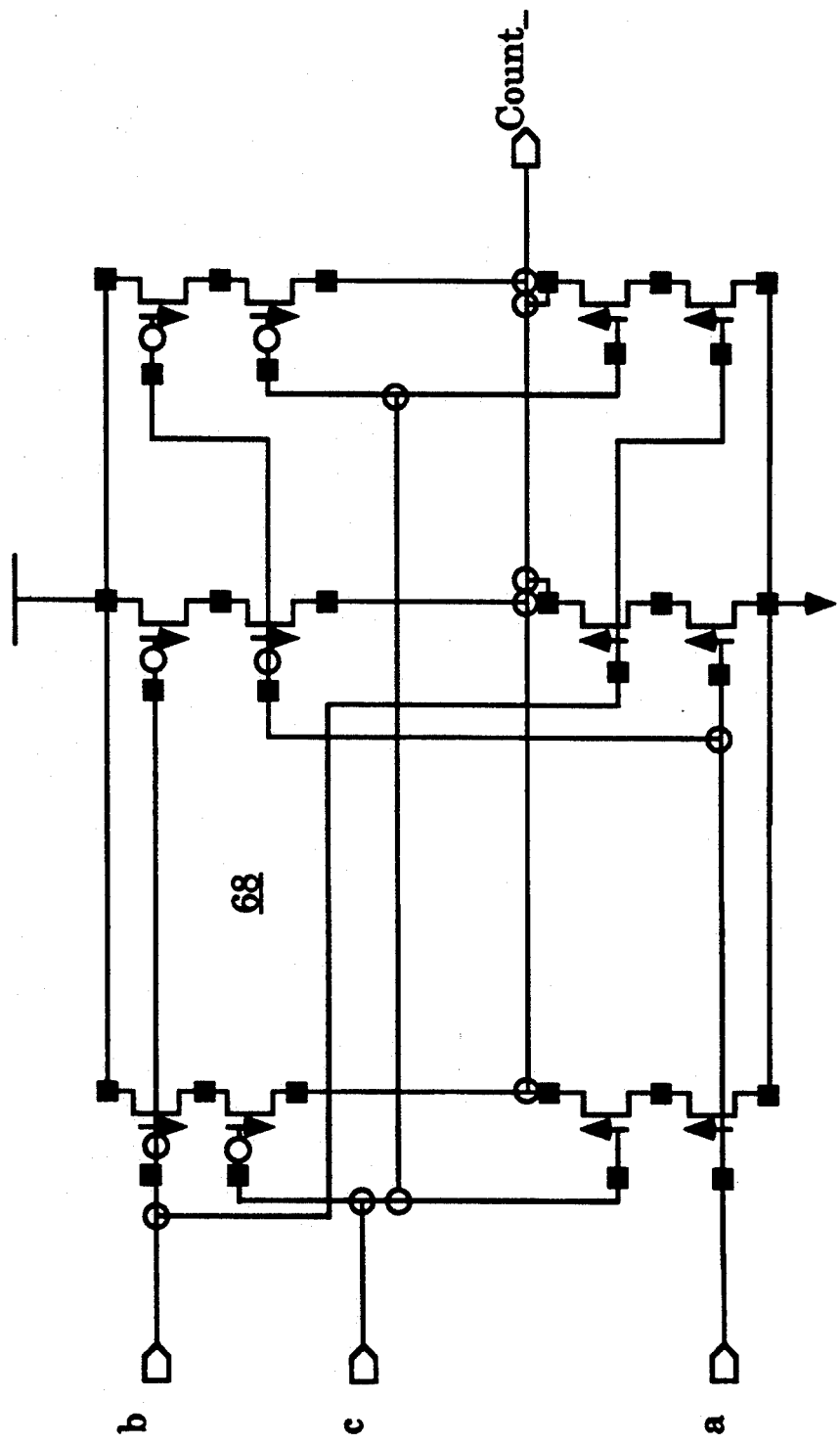
Figure 10:
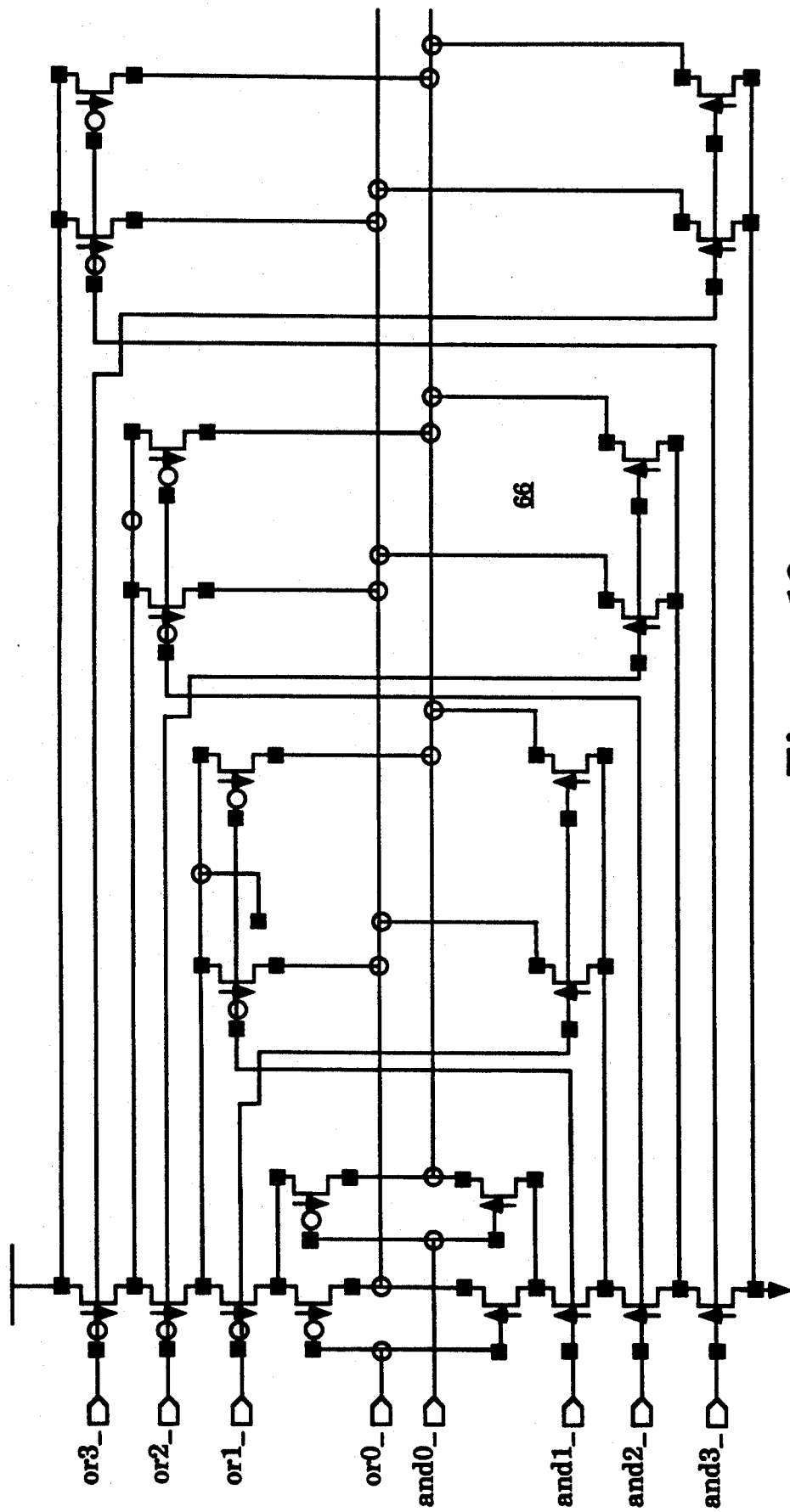
Figure 11:
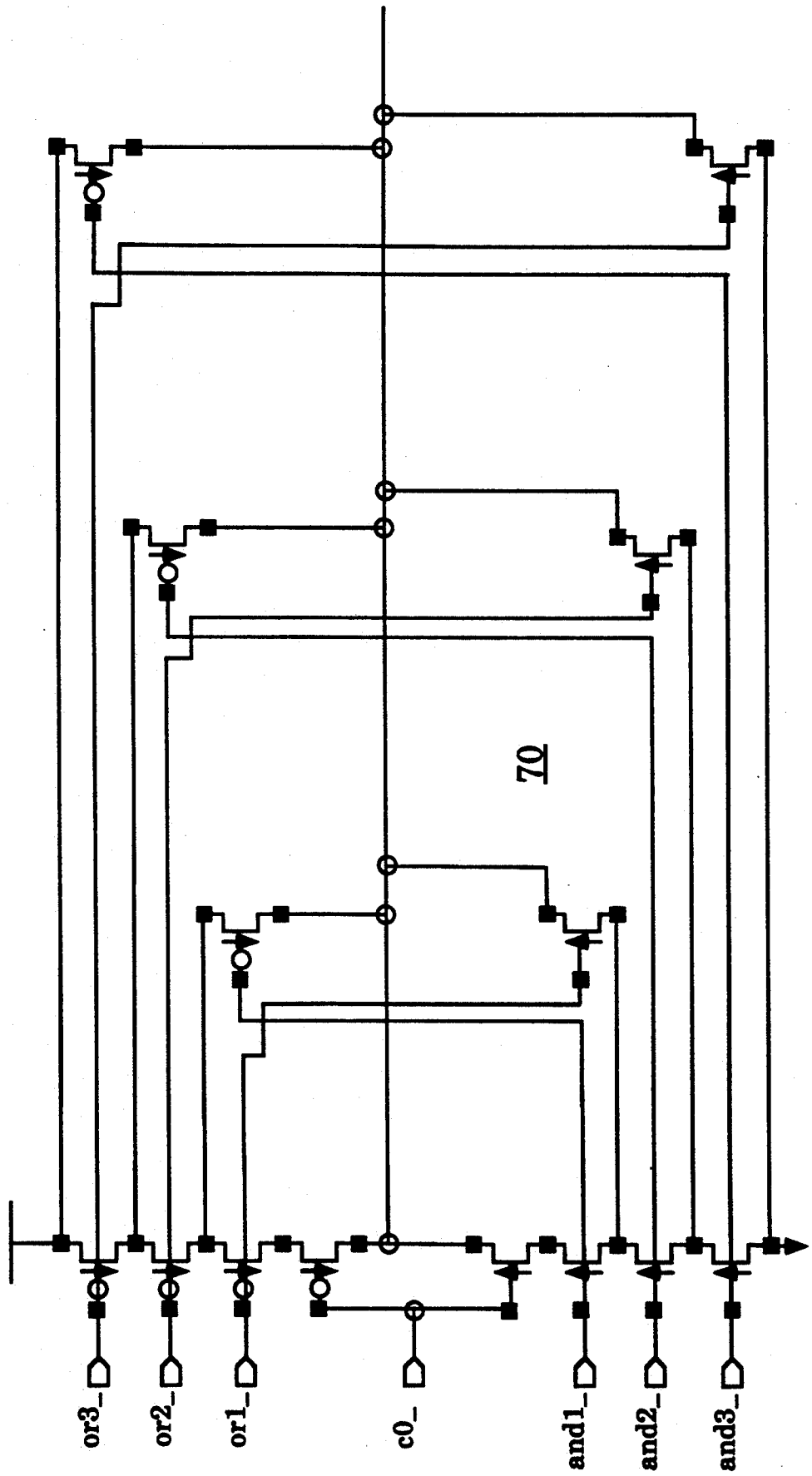

A two bit carry generator and expansion circuit 64 is illustrated in FIG. 8. A two bit carry generator and selector circuit 68 is illustrated in FIG. 9. A four bit carry expander circuit 66 is illustrated in FIG. 10. A four bit selector circuit 70 is illustrated in FIG. 11. Each of these circuits is designed in a similar manner to the circuits discussed in detail above to provide the fastest possible carry out response by eliminating redundant transistors. It should be noted that the merger of the carry out generation and expansion in the circuit 64 and the carry generation and selection in the circuit 68 help reduce the number of stages of the circuit of FIGS. 7a and 7b by one and thus reduce the time required to generate the ultimate carry out signal.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A circuit for rapidly generating a carry out signal resulting from the summation of a first plurality of signals corresponding to a first binary number, a second plurality of signals corresponding to a second binary number, and a first carry in signal, said circuit comprising:

a plurality of carry generator circuits, wherein each of said carry generator circuits receives as inputs a separate and distinct first signal from said first plurality of signals and a separate and distinct second signal from said second plurality of signals, and further wherein, each one of said carry generator circuits outputs a first generator output signal and a second generator output signal, said first generator output signal corresponding to the result of a first logic operation performed upon said first signal and said second signal, said second generator output signal corresponding to the result of a second logic operation performed upon said first signal and said second signal;

a plurality of carry expander circuits wherein each one of said plurality of carry expander circuits receives as inputs a first generator output signal and a second generator output signal from a first distinct one of said plurality of carry generator circuits, a first generator output signal and a second generator output signal from a second distinct one of said plurality of carry generator circuits, and a first generator output signal and a second generator output signal from a third distinct one of said plurality of carry generator circuits, further wherein, each one of said plurality of carry expander circuits outputs a first carry expander output signal and a second carry expander output signal;

a first carry selector circuit receiving as inputs a first generator output signal and a second generator output signal from one of said plurality of carry generator circuits, and said first carry in signal, wherein said first carry selector circuit outputs a first carry selector output signal determined by said first carry in signal;

a second carry selector circuit receiving as inputs a first carry expander output signal and a second carry expander output signal from a first distinct one of said plurality of carry expander circuits, a first carry expander output signal and a second carry expander output signal from a second distinct one of said plurality of carry expander circuits, and said first carry selector circuit output signal, wherein said second carry selector circuit outputs a second carry selector output signal determined by said first carry selector output signal;

wherein said second carry selector output signal is utilized to determine said carry out signal;

and further wherein said second carry selector circuit comprises:

a first transistor including a drain terminal, a gate terminal, and a source terminal, wherein said drain terminal of said first transistor is coupled to a first voltage potential, and said gate terminal of said first transistor receives as input said first carry expander output signal from said second distinct one of said plurality of carry expander circuits;

a second transistor including a drain terminal, a gate terminal, and a source terminal, wherein said drain terminal of said second transistor is coupled to said source terminal of said first transistor, and said gate terminal of said second transistor receives as input said first carry expander output signal from said first distinct one of said plurality of carry expander circuits;

a third transistor including a drain terminal, a gate terminal, and a source terminal, wherein said drain terminal of said third transistor is coupled to said source terminal of said second transistor, and said gate terminal of said third transistor receives as input said first carry selector circuit output signal;

a fourth transistor including a drain terminal, a gate terminal, and a source terminal, wherein said drain terminal of said fourth transistor is coupled to said source terminal of said first transistor, said gate terminal of said fourth transistor receives as input said second carry expander output signal from said first distinct one of said plurality of carry expander circuits, and said source terminal is coupled to said source terminal of said third transistor;

a fifth transistor including a drain terminal, a gate terminal, and a source terminal, wherein said drain terminal of said fifth transistor is coupled to said first voltage potential, said gate terminal receives as input said second carry expander output signal from said second distinct one of said plurality of carry expander circuits, and said source terminal of said fifth transistor is coupled to said source terminal of said fourth transistor;

a sixth transistor including a drain terminal, a gate terminal, and a source terminal, wherein said drain terminal of said sixth transistor is coupled to said source terminal of said third transistor, and said gate terminal of said sixth transistor is coupled to said gate terminal of said third transistor;

a seventh transistor including a drain terminal, a gate terminal, and a source terminal, wherein said drain terminal of said seventh transistor is coupled to said source terminal of said sixth transistor, and said gate terminal of said seventh transistor receives as input said second carry expander output signal from said first distinct one of said plurality of carry expander circuits;

an eighth transistor including a drain terminal, a gate terminal, and a source terminal, wherein said drain terminal of said eighth transistor is coupled to said source terminal of said seventh transistor, said gate terminal of said eighth transistor receives as input said second carry expander output signal from said first distinct one of said plurality of carry expander circuits, and said source terminal of said eighth transistor is coupled to a second voltage potential;

a ninth transistor including a drain terminal, a gate terminal, and a source terminal, wherein said drain terminal of said ninth transistor is coupled to said source terminal of said fourth transistor, said gate terminal of said ninth transistor receives as input said first carry expander output signal from said first distinct one of said plurality of carry expander circuits, and said source terminal of said ninth transistor is coupled to said source terminal of said seventh transistor;

a tenth transistor including a drain terminal, a gate terminal, and a source terminal, wherein said drain terminal of said tenth transistor is coupled to said source terminal of said fifth transistor, said gate terminal of said tenth transistor receives said first carry expander output signal from said second distinct one of said plurality of carry expander circuits, and said source terminal of said tenth transistor is coupled to said second voltage potential; wherein said second carry selector output signal is outputted and measured at the drain terminal of said tenth transistor.

2. The circuit for rapidly generating a carry out signal as recited in claim 1, wherein said first, second, third, fourth, fifth, sixth, seventh, eighth, ninth, and tenth transistors comprise field effect transistors.

3. The circuit for rapidly generating a carry out signal as recited in claim 2, wherein said first, second, third, fourth, and fifth transistors comprise p-channel field effect transistors; and said sixth, seventh, eighth, ninth, and tenth transistors comprise n-channel field effect transistors.

4. A circuit for rapidly generating a carry out signal resulting from the summation of a first plurality of signals corresponding to a first binary number, a second plurality of signals corresponding to a second binary number, and a first carry in signal, said circuit comprising:

a plurality of carry generator circuits, wherein each of said carry generator circuits receives as inputs a separate and distinct first signal from said first plurality of signals and a separate and distinct second signal from said second plurality of signals, and further wherein, each one of said carry generator circuits outputs a first generator output signal and a second generator output signal, said first generator output signal corresponding to the result of a first logic operation performed upon said first signal and said second signal, said second generator output signal corresponding to the result of a second logic operation performed upon said first signal and said second signal;

a plurality of carry expander circuits wherein each one of said plurality of carry expander circuits receives as inputs a first generator output signal and a second generator output signal from a first distinct one of said plurality of carry generator circuits, a first generator output signal and a second generator output signal from a second distinct one of said plurality of carry generator circuits, and a first generator output signal and a second generator output signal from a third distinct one of said plurality of carry generator circuits, further wherein, each one of said plurality of carry expander circuits outputs a first carry expander output signal and a second carry expander output signal;

a first carry selector circuit receiving as inputs a first generator output signal and a second generator output signal from one of said plurality of carry generator circuits, and said first carry in signal, wherein said first carry selector circuit outputs a first carry selector output signal determined by said first carry in signal;

a second carry selector circuit receiving as inputs a first carry expander output signal and a second carry expander output signal from a first distinct one of said plurality of carry expander circuits, a first carry expander output signal and a second carry expander output signal from a second distinct one of said plurality of carry expander circuits, and said first carry selector circuit output signal, wherein said second carry selector circuit outputs a second carry selector output signal determined by said first carry selector output signal;

wherein said second carry selector output signal is utilized to determine said carry out signal; and further wherein each one of said carry expander circuits comprises:

a first transistor including a drain terminal, a gate terminal, and a source terminal, wherein said drain terminal of said first transistor is coupled to a first voltage potential; and said gate terminal of said first transistor receives as input said first generator output signal from said third distinct one of said plurality of carry generator circuits;

a second transistor including a drain terminal, a gate terminal, and a source terminal, wherein said drain terminal of said second transistor is coupled to said source terminal of said first transistor, and said gate terminal of said second transistor receives as input said first generator output signal from said second distinct one of said plurality of carry generator circuits;

a third transistor including a drain terminal, a gate terminal, and a source terminal, wherein said drain terminal of said third transistor is coupled to said source terminal of said second transistor, and said gate terminal of said third transistor receives as input said first generator output signal from said first distinct one of said plurality of carry generator circuits;

a fourth transistor including a drain terminal, a gate terminal, and a source terminal, wherein said drain terminal of said fourth transistor is coupled to said drain terminal of said third transistor, and said gate terminal of said fourth transistor receives as input said second generator output signal from said first distinct one of said plurality of carry generator circuits;

a fifth transistor including a drain terminal, a gate terminal, and a source terminal, wherein said drain terminal of said fifth transistor is coupled to said drain terminal of said second transistor, said gate terminal of said fifth transistor receives as input said second generator output signal from said second distinct one of said plurality of carry generator circuits, and said source terminal of said fifth transistor is coupled to said source terminal of said third transistor;

a sixth transistor including a drain terminal, a gate terminal, and a source terminal, wherein said drain terminal of said sixth transistor is coupled to said drain terminal of said fifth transistor, and said gate terminal of said sixth terminal is coupled to said gate terminal of said fifth transistor;

a seventh transistor including a drain terminal, a gate terminal, and a source terminal, wherein said drain terminal of said seventh transistor is coupled to said first voltage potential, said gate terminal of said seventh transistor receives as input said second generator output signal from said third distinct one of said plurality of carry generator circuits, and said source terminal of said seventh transistor is coupled to said source terminal of said fifth transistor;

an eighth transistor including a drain terminal, a gate terminal, and a source terminal, wherein said drain terminal of said eighth transistor is coupled to said first voltage potential, and said gate terminal of said eighth transistor is coupled to said gate terminal of said seventh transistor;

a ninth transistor including a drain terminal, a gate terminal, and a source terminal, wherein said drain terminal of said ninth transistor is coupled to said source terminal of said third transistor, and said gate terminal of said first transistor is coupled to said gate terminal of said third transistor;

a tenth transistor including a drain terminal, a gate terminal, and a source terminal, wherein said drain terminal of said tenth transistor is coupled to said source terminal of said ninth transistor, and said gate terminal of said tenth transistor receives as input said second generator output signal from said second distinct one of said plurality of carry generator circuits;

an eleventh transistor including a drain terminal, a gate terminal, and a source terminal, wherein said drain terminal of said eleventh transistor is coupled to said source terminal of said tenth transistor, said gate terminal of said eleventh transistor receives as input said second generator output signal from said third distinct one of said plurality of carry generator circuits, and said source terminal of said eleventh transistor is coupled to a second voltage potential;

a twelfth transistor including a drain terminal, a gate terminal, and a source terminal, wherein said drain terminal of said twelfth transistor is coupled to said source terminal of said fourth transistor, said gate terminal of said twelfth transistor is coupled to said gate of said fourth transistor, and said source of said twelfth transistor is coupled to said source of said ninth transistor;

a thirteenth transistor including a drain terminal, a gate terminal, and a source terminal, wherein said drain terminal of said thirteenth transistor is coupled to said source terminal of said fifth transistor, said gate terminal of said thirteenth transistor receives as input said first generator output signal from said second distinct one of said plurality of carry generator circuits, and said source terminal of said thirteenth transistor is coupled to said source terminal of said tenth transistor;

a fourteenth transistor including a drain terminal, a gate terminal, and a source terminal, wherein said drain terminal of said fourteenth transistor is coupled to said source terminal of said sixth transistor, said gate terminal of said fourteenth transistor is coupled to said gate terminal of said thirteenth transistor, and said source terminal of said fourteenth transistor is coupled to said source terminal of said thirteenth transistor;

a fifteenth transistor including a drain terminal, a gate terminal, and a source terminal, wherein said drain terminal of said fifteenth transistor is coupled to said source terminal of said seventh transistor, said gate terminal of said fifteenth transistor receives as input said first generator output signal from said third distinct one of said plurality of carry generator circuits, and said source terminal of said fifteenth transistor is coupled to said second voltage potential;

a sixteenth transistor including a drain terminal, a gate terminal, and a source terminal, wherein said drain terminal of said sixteenth transistor is coupled to said source terminal of said eighth transistor, said gate terminal of said transistor is coupled to said gate terminal of said fifteenth transistor, and said source terminal of said sixteenth transistor is coupled to said second voltage potential;

wherein said first carry expander output signal is outputted and measured at the drain terminal of said fifteenth transistor and said second carry expander output signal is outputted and measured at the drain terminal of said sixteenth transistor.

5. The circuit for rapidly generating a carry out signal as recited in claim 4, wherein said first, second, third, fourth, fifth, sixth, seventh, eighth, ninth, tenth, eleventh, twelfth, thirteenth, fourteenth, fifteenth, and sixteenth transistors comprise field effect transistors.

6. The circuit for rapidly generating a carry out signal as recited in claim 5, wherein said first, second, third, fourth, fifth, sixth, seventh, and eighth transistors comprise p-channel field effect transistors; and said ninth, tenth, eleventh, twelfth, thirteenth, fourteenth, fifteenth, and sixteenth transistors comprise n-channel field effect transistors.

* * * * *

UNITED STATES PATENT AND TRADEMARK OFFICE
CERTIFICATE OF CORRECTION

PATENT NO. : 5,235,539
DATED : August 10, 1993
INVENTOR(S) : Patel

It is certified that error appears in the above-identified patent and that said Letters Patent is hereby corrected as shown below:
(2nd occurrence)

In column 14, claim 4 at line 36, please delete " said " and insert -- said sixteenth --.

Signed and Sealed this

Twenty-first Day of October 1997

Attest:

BRUCE LEHMAN

Attesting Officer

Commissioner of Patents and Trademarks